H. ROUCHER.
BASTING PIN.
APPLICATION FILED JULY 6, 1911.

1,091,085.

Patented Mar. 24, 1914.

Witnesses
Edwin F. McKee
Frances Keroes.

Inventor
Helena Roucher
By Geo. W. Sues.
Attorney

UNITED STATES PATENT OFFICE.

HELENA ROUCHER, OF WHITE CASTLE, LOUISIANA.

BASTING-PIN.

1,091,085.    Specification of Letters Patent.    Patented Mar. 24, 1914.

Application filed July 6, 1911. Serial No. 637,114.

*To all whom it may concern:*

Be it known that I, HELENA ROUCHER, a citizen of the United States, and a resident of White Castle, in the parish of Iberville and State of Louisiana, have invented certain new and useful Improvements in Basting-Pins, of which the following is a specification, reference being had to the accompanying drawings.

This invention has relation to a basting pin employed in closing the access openings cut into fowls in dressing them for the table; and the object of my invention is to provide a device of this general character, of a simple and inexpensive nature and of a neat and durable construction, which shall be capable of convenient and accurate adjustment in position upon a dressed fowl to close the access openings cut into the fowl, as well as holds the legs in a desired position, while the fowl is being roasted.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

Figure 1:
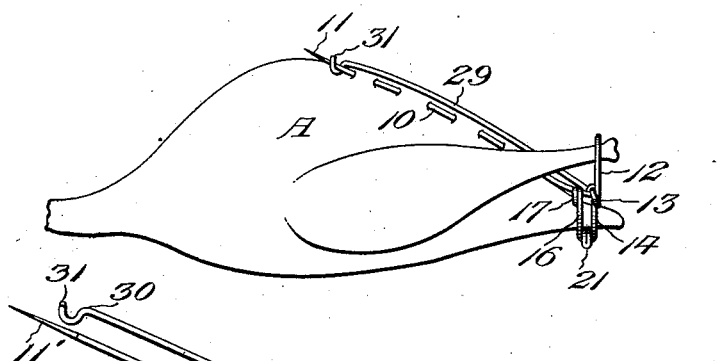
Figure 2:
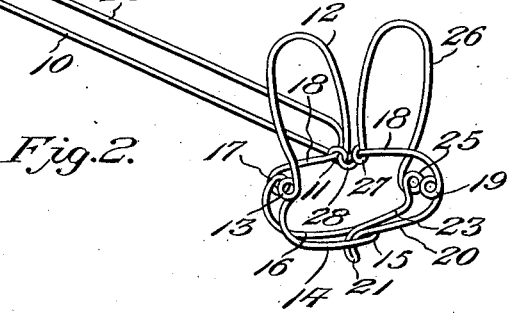

In the accompanying drawings forming a part of this specification, and in which like numerals of reference indicate similar parts in the several views: Figure 1, shows a side elevational view of a portion of a fowl, the rear access opening of which is shown as closed by means of a basting pin constructed according to my invention. Fig. 2, shows a perspective view of the pin.

In preparing poultry for the oven, it is usual to stuff the bird with some sort of dressing, the access opening cut into the belly of the fowl and through which the entrails are removed and the dressing is inserted, usually being closed by means of thread stitching. After the fowl is roasted, the thread is cut and removed. In my present invention I provide a specially shaped basting pin which not only closes the access opening cut in the fowl, but also holds the legs in a desirable position so that the baked bird will look finished and appetizing. The basting pin is readily removed after the fowl has been thoroughly cooked.

In carrying out the aim of my invention, I construct a device made of a single length of spring wire in the form of a safety pin having a laterally extending head comprising a clasping collar ending in a hook and eye, and two laterally extending loops. The pin is used to close the opening cut in the belly of the bird, while the loops hold the legs of the fowl in proper relation to the body, while the fowl is being roasted. The collar is clasped about the tail of the fowl.

In the drawing, the pin is marked 10, and ends in the point 11'. Continued from this stem 10, is the ear 11, from which the member is continued in the leg holding loop 12, this loop ending in the spring coil 13, from which the member is continued in the stem member 14, this member ending in the curved portion 15 forming an eye, from which is continued the stem portion 16, extending parallel to the member 14, and ending in a spring coil 17, held parallel to the coil 13. From this coil the member is continued in the bar portion 18, passing through the ear 11, and terminates in the spring coil 19, from which the member is continued in the hook stem 20, which ends in the hook 21, from which extends the portion 23, counterpart to the member 20, and also terminating in a spring coil 25. From this coil the member is continued in the leg holding loop 26, ending in the ear 27, from which the wire is continued in the portion 28, which is also carried through the ear 11, in the form of the securing stem 29, which has a portion 30, extending at right angles to the stem portion 29, and ending in the hook 31, arranged and engaged by the pin stem. The hook 21, can be brought into engagement with the eye 15.

The loops 12 and 26, are arranged to be sprung over the legs of the bird, as shown in Fig. 1, while the collar formed by means of the members 18, 14, 16, 20 and 23, is adapted to be sprung over the tail of the bird as shown, to hold the legs against displacement during the baking operation. The pin 10, is forced through the flesh of the bird and is secured to the hook 31.

From the foregoing it will be seen that the pin comprises a pointed stem and a securing stem, held in parallel relation, each forming an integral part of a clasping collar, from which extend two leg holding loops.

These pins may be made of any suitable material and are of different sizes so that the same may be used in connection with a small bird as well as with a large one. A basting pin constructed according to my invention is extremely inexpensive while being lasting and durable, and in the use of these basting pins the baked fowl presents a very much more appetizing appearance, than when the openings are closed by ordinary stitching.

Having thus described my said invention, what I claim as new and desire to secure by United States Letters Patent is:—

1. A device of the character described made of a single length of wire comprising a safety pin having a laterally extending head including a clasping collar ending in a hook and eye and having two laterally extending loops said loops held in parallel spaced relation.

2. A device of the character described, made of a single length of spring wire including a pin stem ending in an ear, from which the wire is continued in a leg holding loop said loop ending in the spring coil from which the wire is continued in the form of an eye ending in a spring coil held parallel to said first mentioned spring coil, from this coil the wire is continued in the bar portion terminating in a spring coil from which the wire is continued in the form of a hook ending in the spring coil held adjacent to said last mentioned spring coil, said hook at times being engaged within said eye, said wire being continued from said last mentioned spring coil in a leg holding loop, from which the wire is continued in a stem, ending in a hook to engage said pin.

In testimony whereof I affix my signature, in presence of two witnesses.

HELENA ROUCHER.

Witnesses:
  SIMON LEVY,
  C. JOSEPH.

---

Copies of this patent may be obtained for five cents each, by addressing the "Commissioner of Patents, Washington, D. C."